(12) United States Patent
O'Nash

(10) Patent No.: US 8,851,347 B2
(45) Date of Patent: Oct. 7, 2014

(54) APPARATUS FOR TRANSPORTING CARGO ON A MOTORCYCLE

(76) Inventor: Weston S. O'Nash, Sandy, UT (US)

( * ) Notice: Subject to any disclaimer, the term of this patent is extended or adjusted under 35 U.S.C. 154(b) by 943 days.

(21) Appl. No.: 12/726,942

(22) Filed: Mar. 18, 2010

(65) Prior Publication Data
US 2010/0237117 A1    Sep. 23, 2010

Related U.S. Application Data

(60) Provisional application No. 61/161,321, filed on Mar. 18, 2009.

(51) Int. Cl.
| | | |
|---|---|---|
| B62J 7/00 | (2006.01) | |
| B62J 9/00 | (2006.01) | |
| B60R 9/00 | (2006.01) | |
| B60R 11/00 | (2006.01) | |
| B62B 3/02 | (2006.01) | |
| B62B 5/00 | (2006.01) | |
| B62J 7/04 | (2006.01) | |
| B62J 7/08 | (2006.01) | |
| B62K 5/00 | (2013.01) | |

(52) U.S. Cl.
CPC .............. B62B 3/02 (2013.01); B62B 5/0003 (2013.01); B62K 2005/002 (2013.01); B62J 7/04 (2013.01); B62B 2202/404 (2013.01); B62J 7/08 (2013.01); Y10S 224/924 (2013.01)
USPC ........... 224/413; 224/924; 224/417; 224/431; 224/427; 224/528

(58) Field of Classification Search
USPC ......... 224/413, 924, 484, 274, 448, 417, 416, 224/430, 431, 441, 443, 917.5, 423, 401, 224/405, 408, 427, 525, 528, 452, 454, 457, 224/458, 419, 451, 421, 412, 275; 248/177.1, 544, 346.03, 503; 211/90.01, 90.04, 117, 119.004, 211/119.009, 70.6, 94.01, 193, 182, 80, 81, 211/12, 70.2, 100
See application file for complete search history.

(56) References Cited

U.S. PATENT DOCUMENTS

| | | | | |
|---|---|---|---|---|
| 4,355,746 | A * | 10/1982 | Casady ......................... | 224/274 |
| 4,657,100 | A * | 4/1987 | Lewis .......................... | 180/19.1 |
| 5,588,698 | A * | 12/1996 | Hsueh ...................... | 297/184.11 |
| 5,749,424 | A * | 5/1998 | Reimers ....................... | 180/19.2 |
| 5,931,360 | A * | 8/1999 | Reichert ...................... | 224/413 |
| 6,401,998 | B1 * | 6/2002 | Puluso .......................... | 224/422 |
| 6,659,547 | B2 * | 12/2003 | Petersen .................... | 297/215.1 |
| 6,705,624 | B2 * | 3/2004 | Cassoni .................. | 280/47.131 |

(Continued)

Primary Examiner — Adam Waggenspack
Assistant Examiner — Matthew Theis
(74) Attorney, Agent, or Firm — Morriss O'Bryant Compagni, PC

(57) ABSTRACT

An apparatus for transporting cargo on a motorcycle comprises a first rack having a width of about the width of a seat of a motorcycle. The first rack has a first plurality of attachment structures fixedly attached thereto. A second rack has a base with a second plurality of attachment structures fixedly attached to a bottom of the base configured for engaging with and being secured to the first plurality of attachment structures. The second rack is positioned on top of the first rack when secured thereto and includes a pair of upwardly extending elongate members fixedly coupled to the base and angled toward the rear of the motorcycle. The elongate members are each provided with a transversely extending receiving member and a centrally located receiving bracket attached proximate a rearward side of the base, thus forming a three-point attachment structure for attaching an accessory to a motorcycle.

19 Claims, 12 Drawing Sheets

(56) References Cited

U.S. PATENT DOCUMENTS 7,287,765 B2 * 10/2007 Murphy et al. ............ 280/47.26
2005/0258207 A1 * 11/2005 Sadler ........................ 224/413
2008/0169323 A1 * 7/2008 Deitrich ...................... 224/413
2010/0170924 A1 * 7/2010 Johnson ...................... 224/413

* cited by examiner

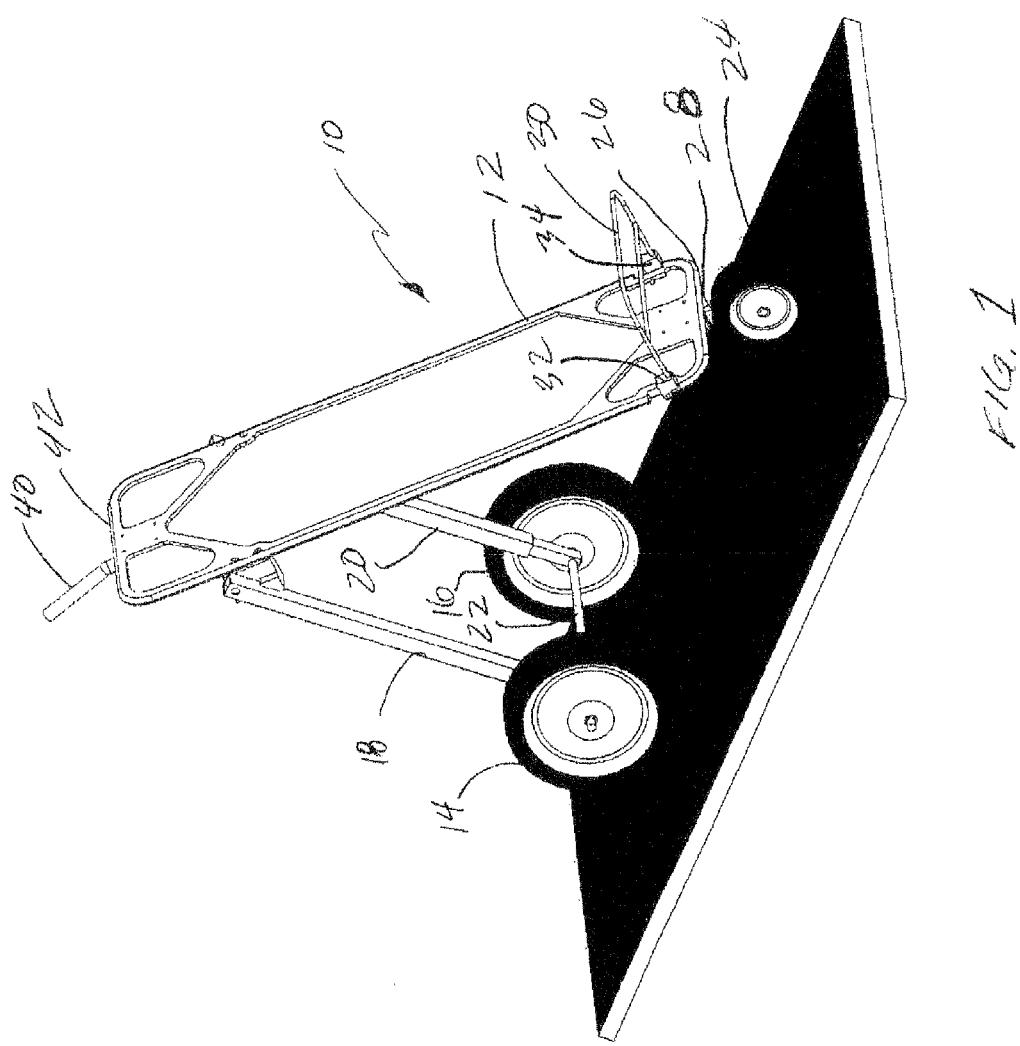

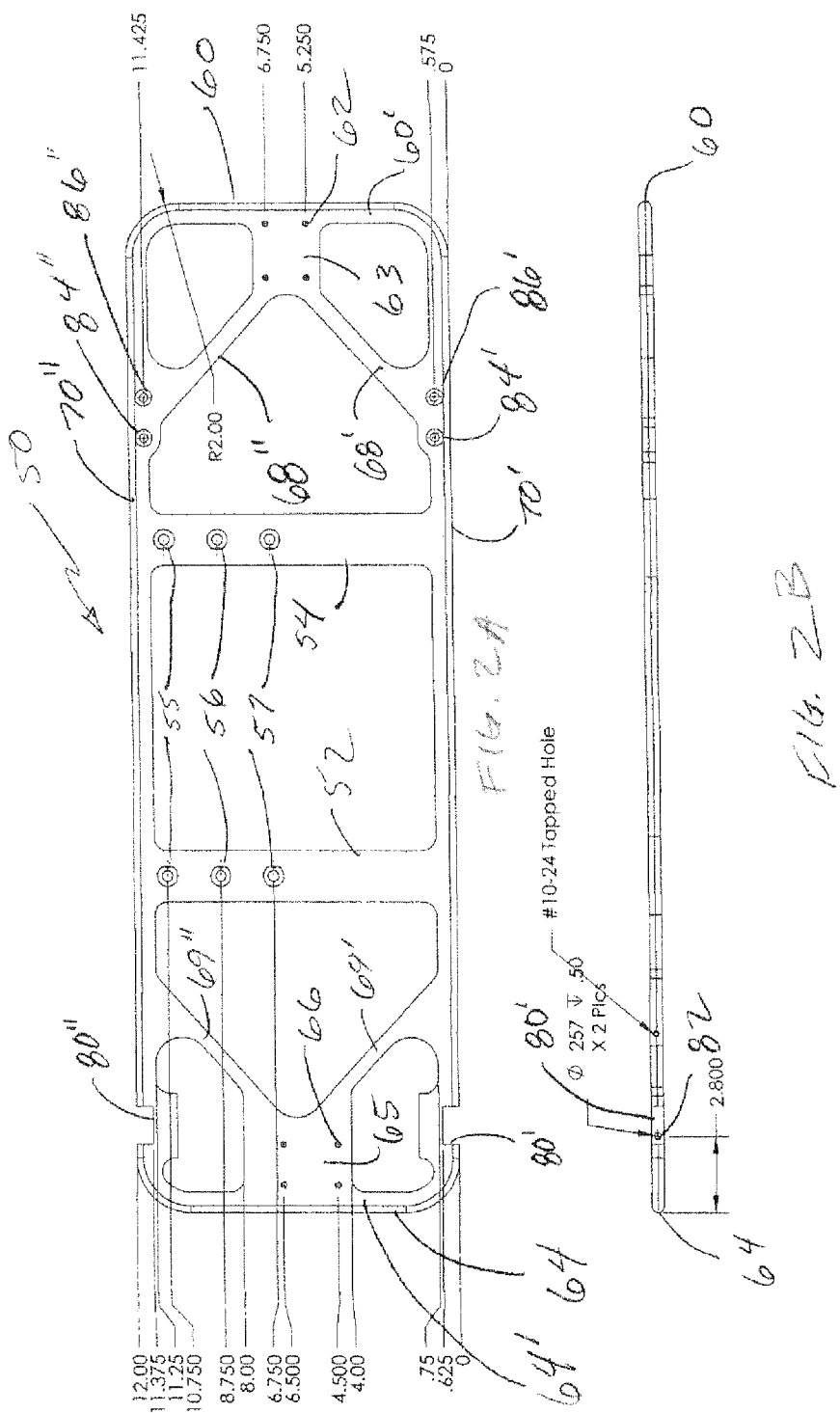

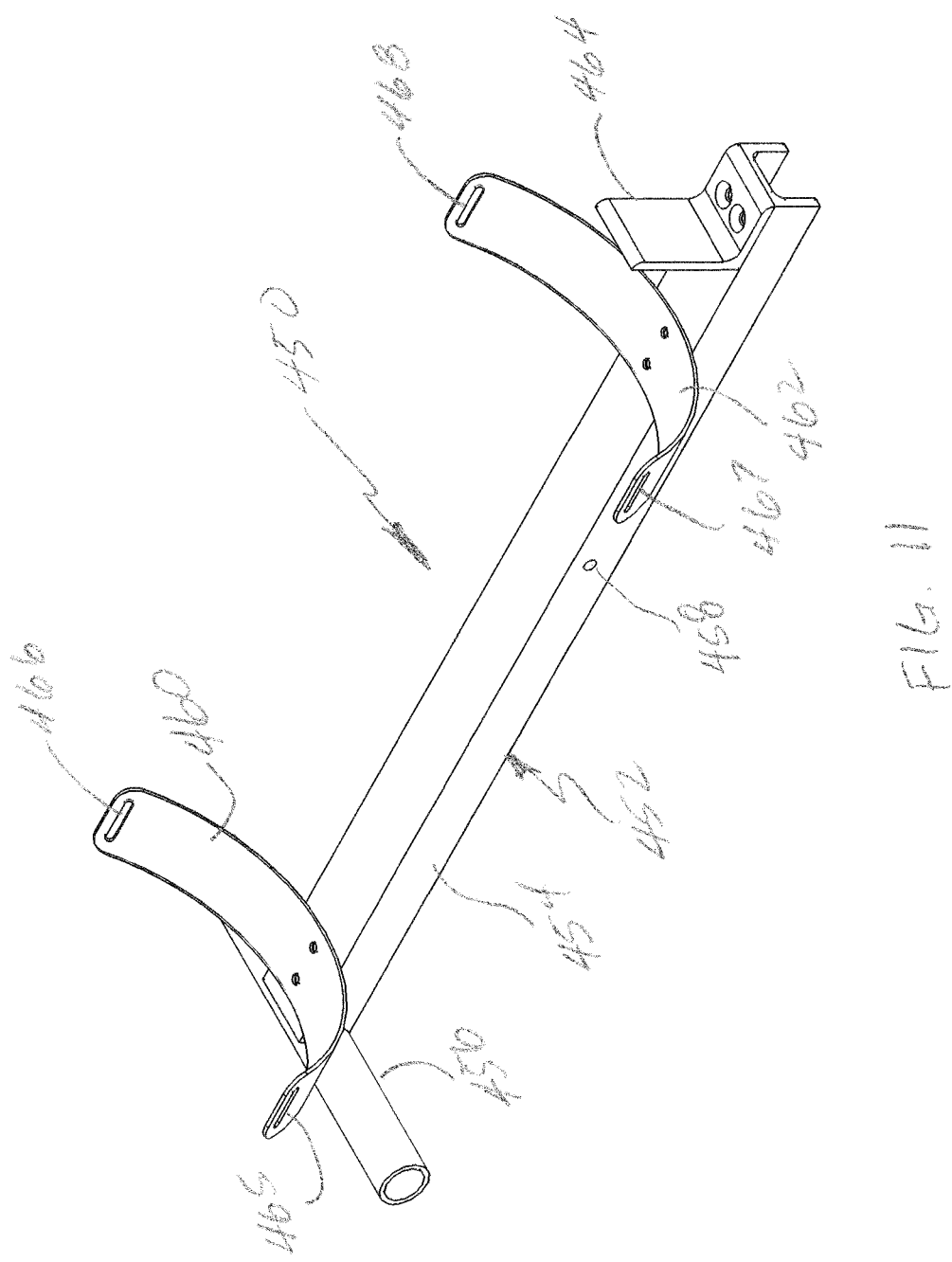

APPARATUS FOR TRANSPORTING CARGO ON A MOTORCYCLE

CROSS-REFERENCE TO RELATED APPLICATION

This application claims priority to U.S. Provisional Patent Application Ser. No. 61/161,321 filed on Mar. 18, 2009, entitled GOLF CART, the entirety of which is incorporated by this reference.

BACKGROUND OF THE INVENTION

1. Field of the Invention

The present invention relates to an accessory mounting system for motorcycles, and more specifically to a mounting system for motorcycles that is capable of carrying a golf bag, a golf cart, a bicycle, luggage and other items in a manner that allows for quick attachment and removal of such items and in a manner that substantially maintains a center of balance with the motorcycle to which such items are attached.

2. State of the Art

Motorcycles, such as Harley-Davidson motorcycles, often come standard with a rear cargo rack extending over the rear wheel. While this rack is useful for supporting cargo that is of a width that does not exceed the width of the rack, it is often desirable to be able to transport larger items, such as a golf bag, on the back of the motorcycle. Moreover, it would be very difficult, and even dangerous, to attempt to transport a golf bag and a golf cart, commonly referred to as a "pull cart", or other large items on a motorcycle using the rear cargo rack that comes standard on many motorcycles. Thus, there exists a need in the art to provide an apparatus for transporting golf clubs, a golf cart that one can use to use on the golf course and golf clubs, luggage, a bicycle or other larger items that are not easily transported on a motorcycle. There is also a need in the art to provide such a system that does not require any physical modifications to the existing motorcycle.

SUMMARY OF THE INVENTION

Accordingly, a first motorcycle rack is configured to be releasably coupled to a motorcycle and to provide a docking platform for attachment of a second motorcycle rack to which other accessories can be attached. The first rack is of a configuration that is of a width similar in size to the width of a stock motorcycle rack, thus having a width about the width of the seat of the motorcycle. The first rack is capable of functioning as a stand-alone rack having a plurality of cross-members forming a substantially horizontal rack at the rear of the motorcycle and extending over the rear wheel of the motorcycle. The first rack is provided with a plurality of hollow, cylindrical docking members permanently attached to the first rack and oriented with the longitudinal axis of the docking members being substantially vertically oriented. The second rack is provided with downwardly extending posts that are configured to be received within the docking members and releasably attached thereto. When attached, the second rack is rigidly mounted to the second rack.

In one embodiment, the second rack is an elongate rack that extends a width that is wider than the seat of the motorcycle and more particularly as wide as approximately the width of the motorcycle. For a Harley-Davidson motorcycle with saddlebags attached thereto, the second rack may be of a width approximately equal to the width of the motorcycle at the location of the saddlebags with the second rack positioned over the saddlebags.

In another embodiment, the second rack is comprised of a pair of upwardly extending posts that are angled toward the rear of the motorcycle, the posts are each provided with transversely extending receiving members on the distal end of each post. A centrally located receiving bracket is attached to the second rack at a rear side thereof, thus forming a three-point attachment structure for securing various other accessories to the motorcycle.

Each accessory to which attachment to the second mounting bracket is desired is provided with a T-shaped mounting member. The transversely extending arms of the T-shaped mounting member are held within the transversely extending receiving members with the leg of the T-shaped mounting member being releasably attached to the centrally located receiving bracket.

When used in combination with a golf pull cart according to the principles of the present invention, the golf pull cart is configured such that the rear axle is held within the receiving members and a frame member is held in the receiving bracket. The cart is configured to be foldable with a golf bag attached thereto.

In another embodiment, the golf cart may be configured to have a rack-like form such that the apparatus is wide enough and long enough to support a standard golf bag or golf travel bag. When removed from the motorcycle, the rack-form can be converted to a golf pull cart for transporting the golf clubs that were attached to the rack during transport on the motorcycle.

Each accessory is attached to the second rack in a manner that prevents inadvertent release of the accessory during transportation or inadvertent release of the second rack from the first rack for safety reasons.

BRIEF DESCRIPTION OF THE DRAWINGS

FIG. 1 is a perspective view of a first embodiment of a motorcycle cargo rack in the form of a golf push cart in accordance with the principles of the present invention.

FIGS. 2A and 2B are top and side views of the base of the cargo rack illustrated in FIG. 1.

FIG. 11 is a side perspective view of a golf back cargo rack in accordance with the principles of the present invention.

DETAILED DESCRIPTION OF THE ILLUSTRATED EMBODIMENTS

Figure 3A:
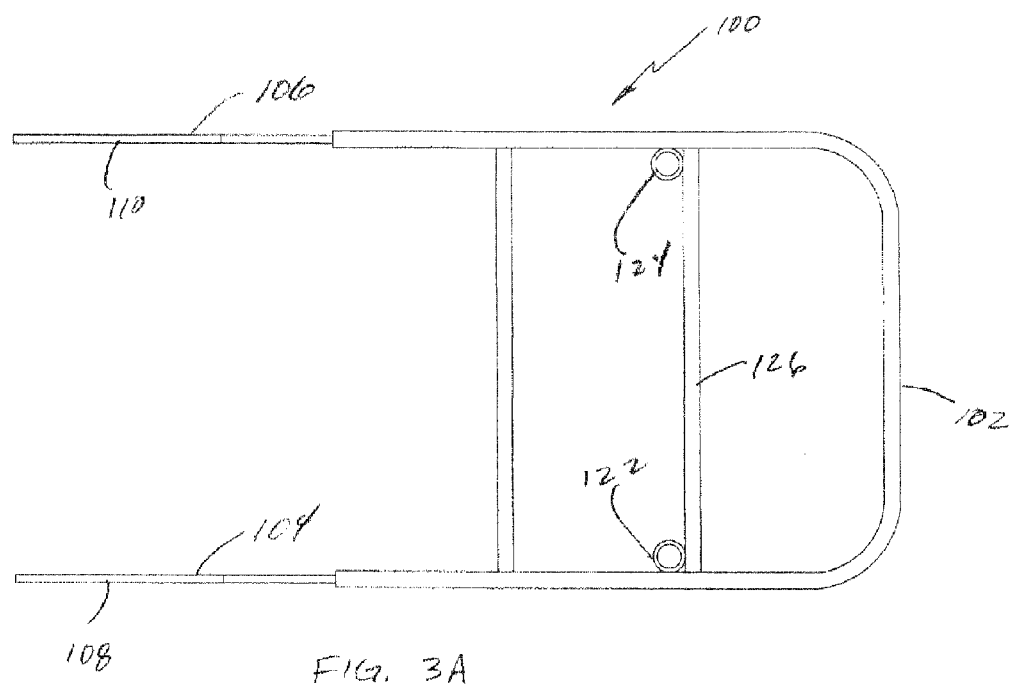
FIGS. 3a and 3B are top and side views of a motorcycle rack in accordance with the principles of the present invention.

As shown in FIG. 1, a golf pull cart, generally indicated at 10 is illustrated. The golf purl cart is comprised of a generally planar and rectangular rack member 12. A pair of rear wheels 14 and 16 is attached to the rack member 12 by a pair of elongate legs 18 and 20, respectively. The wheels 14 and 16 are rotatably attached to the distal ends of the legs 18 and 20 with an axle 22 that spans between the two legs 18 and 20. The wheels 14 and 16 are releasably and rotatably attached to the axle 22. The wheels 14 and 16 may be releasably held to the axle 22 with removable pins that are inserted through the axle 22 on the outsides of each wheel. A front wheel 24 is rotatably and releasably attached to the distal end 26 of the rack member 12. The front wheel is rotatably attached to an arm member 28 that is attached to the back side of the rack member 12.

A bottom bag support member 30 is pivotally attached to the rack member 12 proximate its distal end 26. The support member 30 can be rotated approximately 90 degrees relative to the rack member 12, from a closed or folded position in which the support member 30 lays against the rack member 12 to an open or supporting position as shown. A pair of bottom support coupling members 32 and 34 abuts against the rack member to prevent the support member 30 from rotating more than about 90 degrees.

A pull handle 40 is releasably attached to the proximal end 42 of the rack member 12. The handle 40 is used to maneuver the cart 10. The handle 40 is attached to the back side of the rack member 12.

As shown in FIGS. 2A and 2B, a rack member 50 according to the present invention may be comprised of a generally rectangular plate of material, such as aluminum or other lightweight metal, that is machined to remove material in order to reduce the weight of the rack member 50. The rack member 50 is formed with lateral cross-member portions 52 and 54 that span the width of the rack member 50. The cross-member portions 52 and 54 are provided with a plurality of hole pairs 55, 56 and 57. The hole pairs 55, 56 and 57 are provided for mounting of a pair of rack attachment members for mounting the rack member 50 to a motorcycle. By providing the hole pairs 55, 56 and 57, an associated pair of rack attachment members can be attached to the rack member 50 at any one of three locations to allow the rack member 50 to be adjusted relative to the motorcycle when attached.

Proximate to the proximal end 60 of the rack member 50, a plurality of holes 62 is provided in a first plate portion 63 for attachment of the handle member. On the opposite distal end 64 a plurality of holes 66 is provided in a second plate portion 65 to attach the front wheel. The first plate portion 63 is supported by angular strut portions 68' and 68" that are interposed between the first plate portion 63 and the side rail members 70' and 70", respectively, and the proximal end portion 60', respectively. Likewise, the second plate portion 65 is supported by angular strut portions 69' and 69" that are interposed between the second plate portion 65 and the side rail members 70' and 70", respectively, and the distal end portion 64'.

Proximate the distal ends of the side rail members 70' and 70", the rack member 50 defines recesses 80' and 80", respectively. The recesses 80' and 80" are provided to receive the pivoting attachment members for the lower bag support member that spans the distal end of the rack member 50. The holes 82 are provided through the frame member 50 at the location of each recess 80' and 80" to pivotally attach the lower bag support member.

Proximate to the proximal end 60 are provided leg attachment holes 84' and 86". The legs are pivotally attached to the rack member 50 by attachment of leg mounting members to the holes 84' and 86".

Figure 3B:
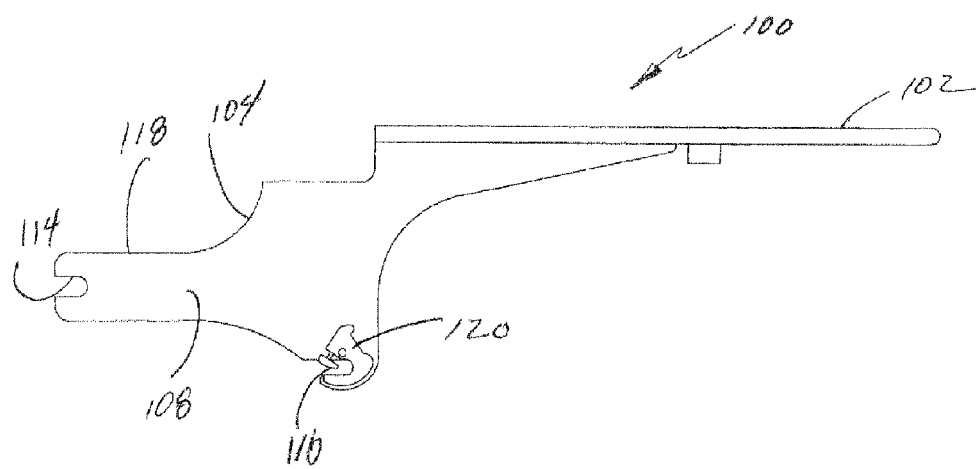

As shown in FIGS. 3A and 3B, a motorcycle rack 100 is configured for attachment to the frame of a motorcycle. The rack 100 includes a cargo rack portion 102 and mounting portions 104 and 106. The mounting portions 104 and 106 are comprised of flat, plate-like attachment members 108 and 110 that are fixedly attached, as by welding to the rack portion 102. Receiving slots 114 and 116 are provided in the free end 118 of each attachment member 108 and 110 to attach to spaced-apart, slotted bolts attached to the motorcycle frame. A locking mechanism 120 is attached to the attachment member adjacent the slot 116 to releasably lock the attachment member 108 to the slotted bolt to prevent the attachment member 108 from being inadvertently removed from the slotted bolt. An identical locking mechanism is provided for attachment member 110.

The rack portion 102 includes a pair of hollow cylindrical attachment members 122 and 124 for selectively releasable attachment of the rack member that forms part of the golf cart of the present invention. The attachment members 122 and 124 are fixedly attached, as by welding, to the rack portion 102 and are positioned on opposite sides of a rack crossmember 126 to provide maximum transverse spacing between the attachment members 122 and 124. As will be described in more detail, the rack member is provided with a pair of attachment pins that are inserted into the attachment members 122 and 124 are secured thereto. This attachment holds the rack member to the rack portion 102 during transport and allows for selective removal of the rack member when a destination is reached.

Accordingly, when the rack member that forms part of the golf cart is not being transported, the motorcycle rack 100 can be used to transport other smaller cargo, such as a small travel bag or the like. By providing a usable cargo rack 100 as the means of attaching the golf cart to the motorcycle, one is not deprived of a usable cargo rack when the golf cart is removed from the rack. Thus, the rack 100 serves a dual purpose. In addition, because the golf cart can be attached to the rack 100 with two pins, the cylindrical attachment members 122 and 124 do not interfere with the functionality of the rack and provide a minimal impact on the aesthetic quality of the rack 100.

Figure 4:
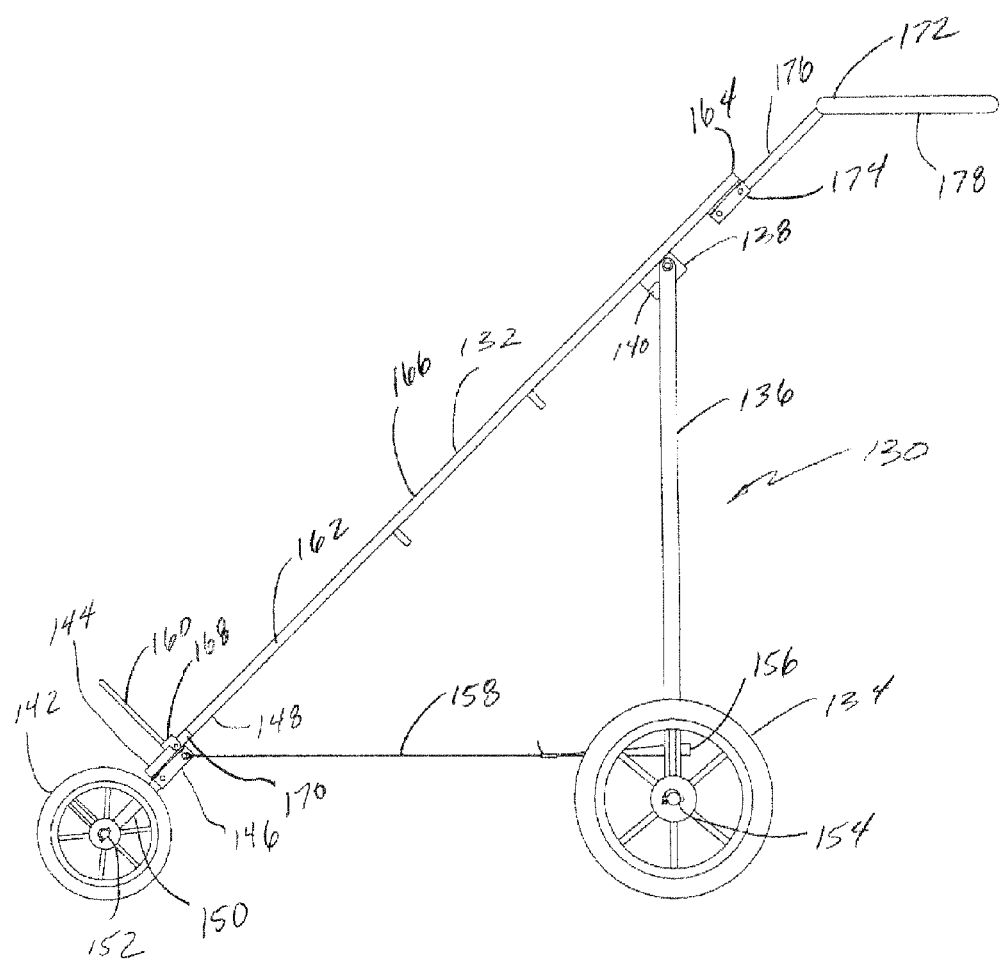
FIG. 4 is a second embodiment of a motorcycle cargo rack in the form of a golf push cart in accordance with the principles of the present invention.

Referring now to FIG. 4, there is illustrated a golf cart, generally indicated at 130 in accordance with the principles of the present invention. The golf cart 130 is shown in a fully assembled form and includes a frame 132 to which the various other components to the golf cart 130 are attached. A set of rear wheels, only wheel 134 of which is visible are attached to the frame 132 with a pivotable leg 136. The leg 136 is attached to the frame 132 with the mounting bracket 138. The mounting bracket 138 includes an angular abutment portion 140 that abuts against the leg 136 to hold the leg at about a 45 degree angle between the leg and the frame 132 when the leg 136 is positioned as shown in a fully unfolded position. A front wheel 142 is releasably coupled to the lower or distal end 144 of the frame 132 with a mounting bracket 146 attached to the bottom side 148 of the frame 132. The mounting bracket 146 defines an opening therein for receiving an elongate wheel mount 150 that is inserted and pinned to the mounting bracket 146. The wheel 150 is rotatably attached to the wheel mount 150 with an axle member 152.

Similarly, the rear wheel 134 is rotatably attached to a rear axle 154 that spans between the legs (only leg 136 being visible). A leg support cross-member 156 is attached to and between the legs 136 to hold the legs apart when in use. A tether 158, which may be comprised of an adjustable nylon strap, is coupled between the mounting bracket 146 and the cross-member 156. The tether 158 biases and holds the rear legs 136 against the abutment portion 140 and thus holds the legs 136 a predefined distance from the distal end 144 of the frame 132. Accordingly, a triangularly shaped cart 130 is formed as defined by the frame 132, legs 136 and tether 158.

A lower bag rest member 160 is pivotally attached to the longitudinal sides 162 of the frame 132 proximate the distal end 148. The bag rest member 160 is pivotable about 90 degrees from an open position as shown to a closed position in which the bag rest member 160 is pivoted toward the proximal end 164 of the frame 132 to lie relatively flat against the top surface 166 of the frame 132. The bag rest member 160 is coupled to the frame 132 by being fixedly attached at its sides to mounting members 168 that are pivotally attached to the sides 162 of the frame 132. The frame 132 defines recesses 170 at the location of the mounting members 168 so that when rotated to an open position as shown, the mounting member 168 abuts the top surface 166 of the frame to prevent further rotation of the bag rest member 160. The mounting member 168 has a generally "L" shaped configuration to provide an abutment surface in an open position to abut against the top surface 166.

At the proximal end 164 of the frame 132, a handle 172 is releasably attached to a handle mounting bracket 174. The handle 172 includes an elongate mounting portion 176, a portion of which is inserted into and releasably mounted as by pinning to the mounting bracket 174. An oval shaped gripping portion 178 is attached to a proximal end the mounting portion 176. The angle between the mounting portion 176 and the gripping portion 178 is about 135 degrees so that the handle is generally horizontally oriented when the cart is in its assembled and usable form as shown.

Figure 5:
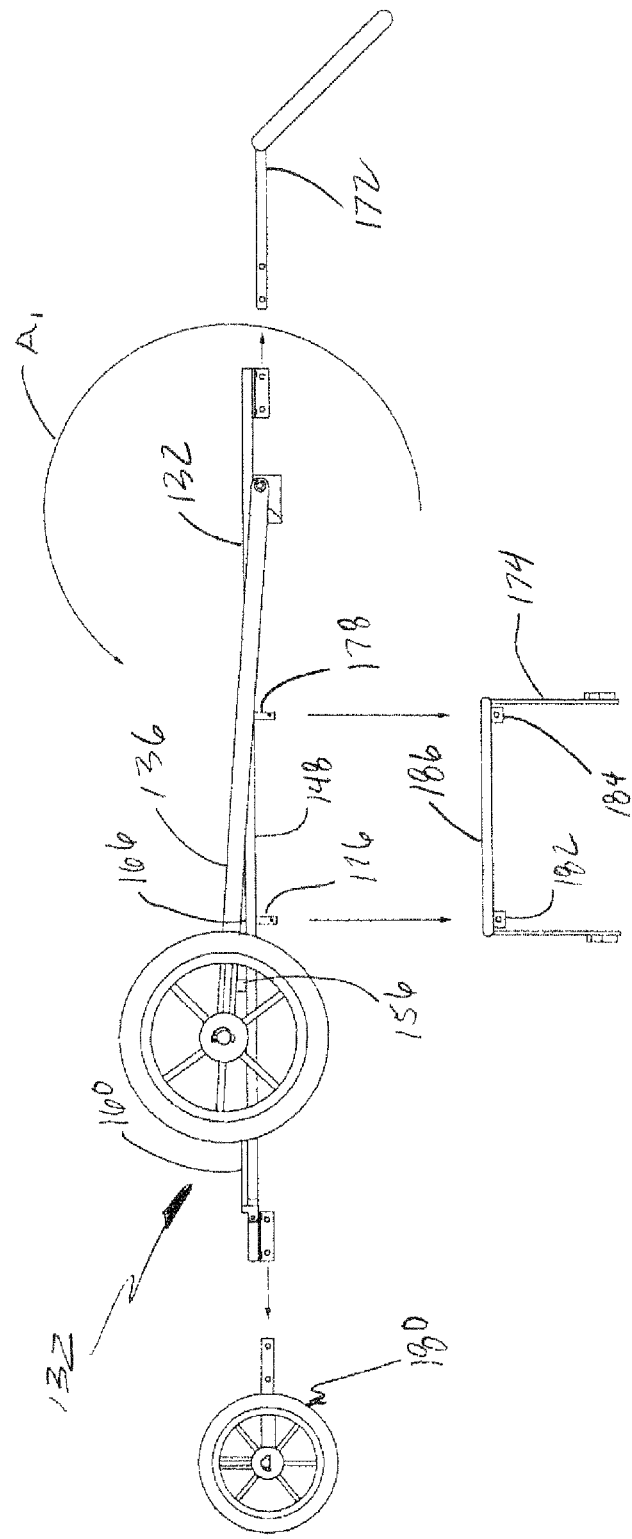
FIG. 5 is a partially exploded side view of the motorcycle cargo rack illustrated in FIG. 4.

As shown in FIG. 5, the cart 130 can be folded for transport on a motorcycle (not shown). The cart 132 can be collapsed by removing the tether 158 (shown in FIG. 4) and rotating the legs 136 as shown by arrow A₁ until the cross member 156 rests on the top surface 166 of the frame 132. The frame 132 is then attached to a motorcycle rack 174 according to the present invention that has been mounted to the frame of a motorcycle (not shown). A pair of spaced-apart pins 176 and 178 is fixedly mounted to the bottom surface 148 of the frame 132 and approximately perpendicularly extends from the bottom surface 148. The pins 176 and 178 are generally aligned parallel to the longitudinal axis of the frame 132. A pair of equally spaced-apart pin receiving members 182 and 184 is fixedly attached to the rack 174. The pins 176 and 178 are inserted into the receiving members 182 and 184, respectively, and pinned in place with holes provided in the pins 176, 178 and receiving members 182, 184 that align when the bottom 148 of the frame 132 rests on the top surface 186 of the rack 174.

Figure 6:
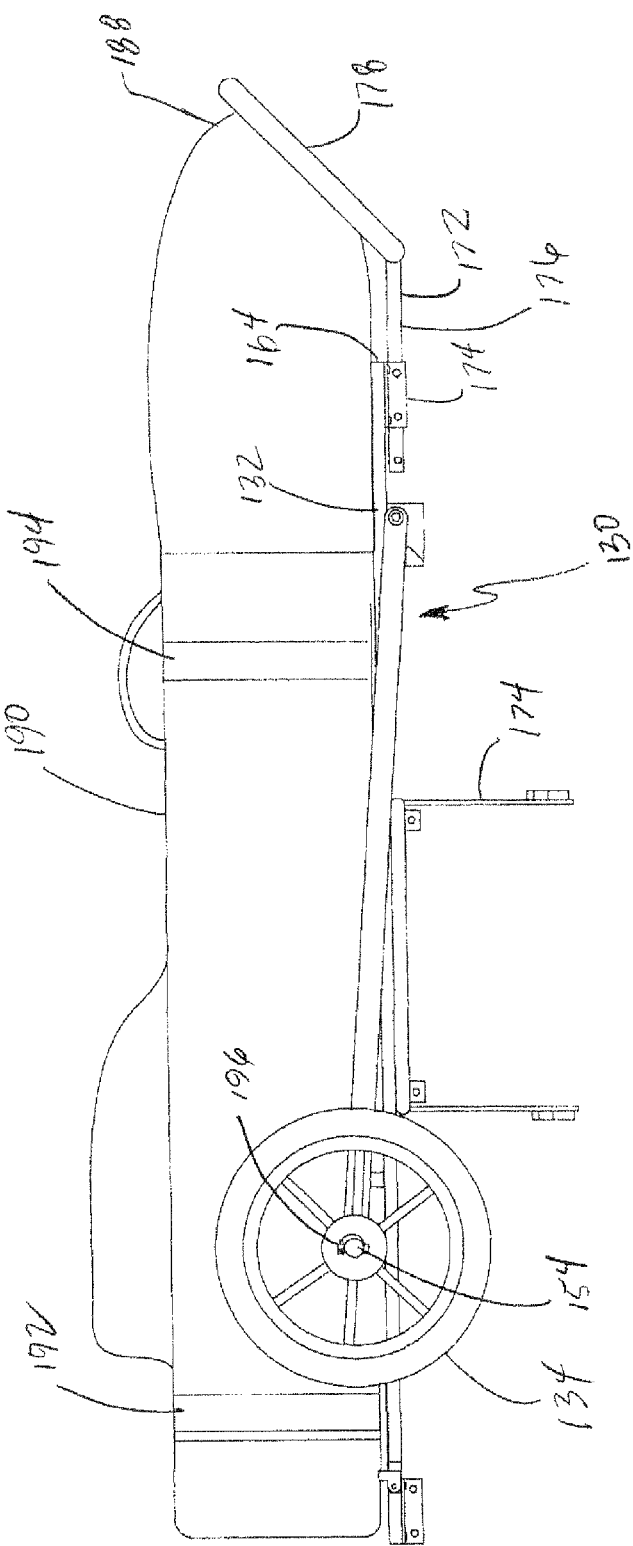
FIG. 6 is a side view of the motorcycle cargo rack illustrated in FIG. 4 having a golf bag attached thereto.

Once the frame 132 is attached to the rack 174, the front wheel assembly 180 and handle 172 are removed from the frame 132 and the bag support member 160 is folded against the top surface 166 of the frame 132. As shown in FIG. 6, the handle 172 is rotated 90 degrees and reattached to the mounting member 174. The handle mounting portion 176 is attached at a second position relative to the mounting bracket 174 so that the handle portion 178 is closer to the distal end 164 of the frame 132 than when used as a handle in operation of the cart 130. The handle portion 178 provides a support for the proximal end 188 of the golf bag 190 and more specifically for the club heads (not visible) contained within the golf bag 190. This support helps to reduce vibration between adjacent club heads within the bag 190 that can result in an annoying sound while traveling and also helps to maintain the longitudinal position of the bag 190 relative to the frame 132. Attachment straps 192 and 195 are wrapped around the bag 190 and the frame 132 and secured to hold the bag 190 to the frame 132 during transport.

The axle 154 is configured to allow quick removal of the wheels 134 therefrom. A transverse, releasable pin 196 is inserted through a transverse hole in the axle 154. By removing the pins from both sides the wheel 134 on the opposite side of the bag can be removed. Reinserting the pin on that side allows the axle 154 to be slid out to expose additional axle length. The wheel that has been removed can then be placed on the exposed portion of the axle. The pin 196 is then reinserted into the axle 154 to hold both wheels 134 on the same side of the bag 190. This creates more space on the opposite side of the frame 132 that is closest to the rider of the motorcycle. The position of the frame 132 when attached to the rack 174 is such that the bag 190 is generally balanced over the rack 174 to provide stability when riding a motorcycle to which the rack 174, cart 130 and bag 190 are attached. In addition, the cart 130 is positioned far enough behind the motorcycle that the user can still fully access saddlebags attached to the motorcycle for those motorcycles utilizing saddlebags. This allows the user to store the front wheel when removed from the frame 132 during transport to narrow the width of the load.

Figure 7A:
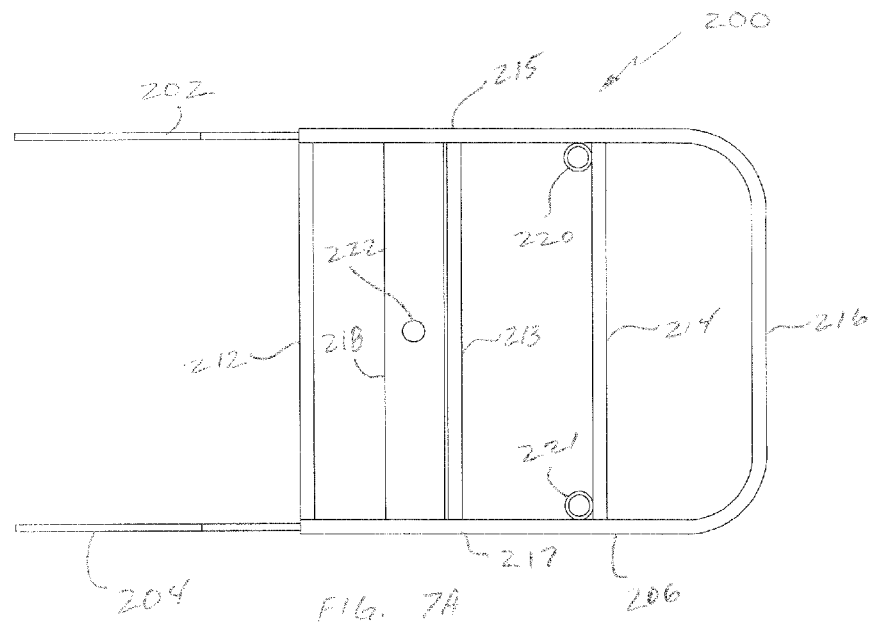
FIGS. 7A and 7B are top and side views of a primary motorcycle cargo rack forming docking station according to the principles of the present invention.
Figure 7B:
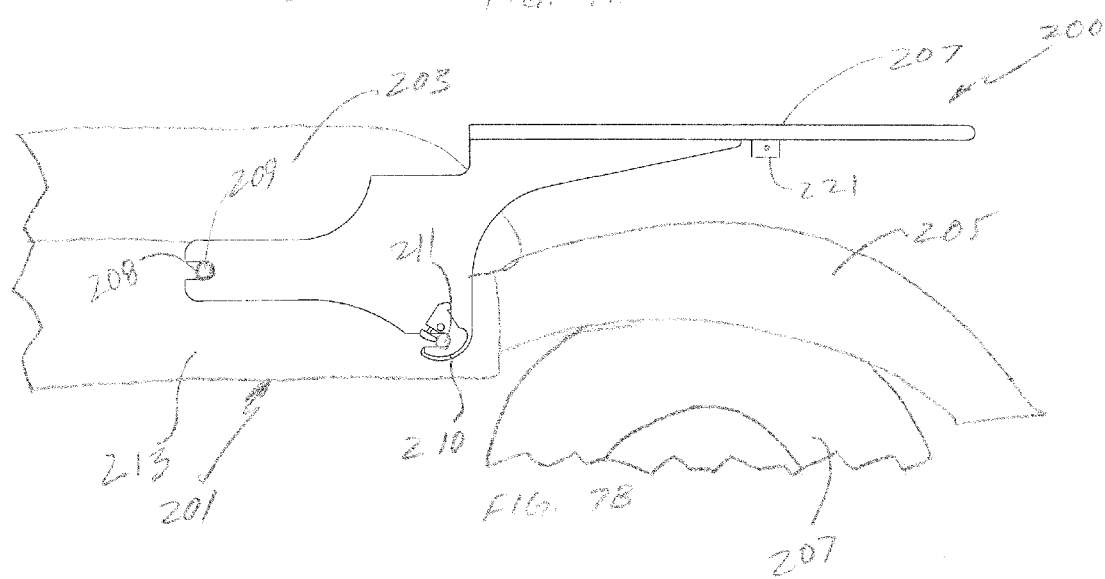

Referring now to FIGS. 7A and 73, there is illustrated a selectively motorcycle rack 200 configured for attachment to a motorcycle, such as a Harley-Davidson motorcycle. The rack 200 is provided with a pair of opposing attachment arms 202 and 204 that depend from rack grid 206 comprised of a plurality of tubular members forming a supporting surface 207. The arms 202 are provided with features, such as slot 208 and securing mechanism 210 that selectively lock the rack 200 to existing mounting hardware found on the motorcycle. Obviously, for other models or brands of motorcycles, the arms may need to have a different configuration and provided with other features that are configured to attach to the particular motorcycle. The rack 200 is configured to attach behind the seat of the motorcycle with the rack grid 206 extending at least partially over the rear wheel of the motorcycle.

The rack grid 206 is comprised of a plurality of tubular cross-members 212, 213, and 214 and perimeter members 215, 216 and 217. In addition, planar cross-member 218 is also provided. Docking members 220, 221 and 222 are fixedly attached to the rack grid 206. The docking members 220, 221 and 222 are comprised of hollow cylindrical members that are attached to the various members of the grid 206 as by welding. The docking members 220, 221 and 222 are substantially vertically oriented when the rack 200 is positioned as shown in FIG. 78 with the supporting surface 207 being substantially horizontal. Thus, the docking members 220, 221 and 222 are oriented with their longitudinal axis substantially perpendicular to the plane defined by the supporting surface. The rack 200 is configured for attachment to a motorcycle 201 with the rack positioned rearward of the seat 203 and extending over the rear fender 205 and tire 207. The rack 200 has a width that is about the width of the seat 203 with the attachment arms 202 and 204 positioned on opposite sides of the seat 203. The arms 202 and 204 are attached to the bolts, pins or other post-like structures 209 and 211 that are fixedly attached to the frame or body 213 of the motorcycle 201.

Figure 8A:
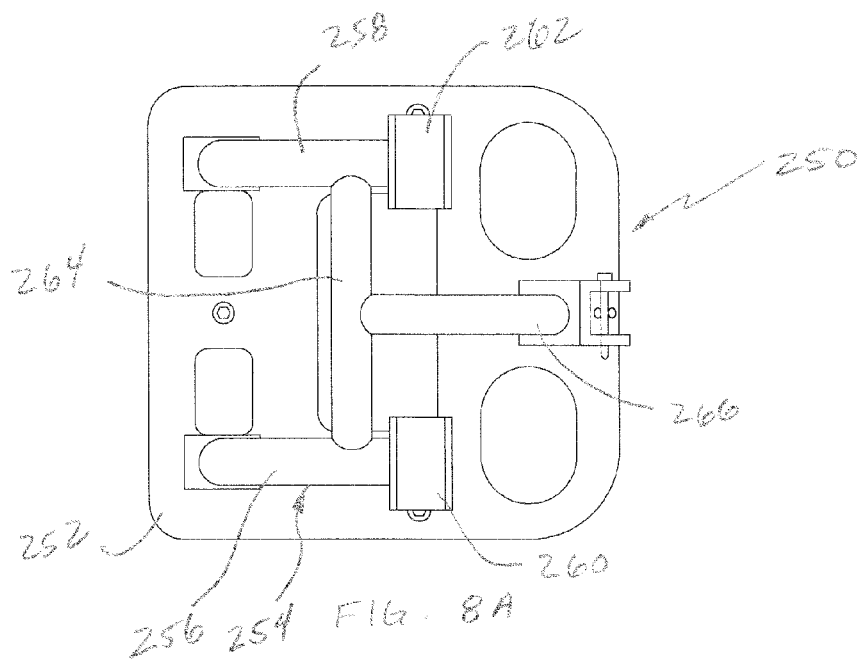
FIGS. 8A and 8B are top and side views of a first embodiment of a secondary motorcycle cargo rack forming an upright rack in accordance with the principles of the present invention.
Figure 8B:
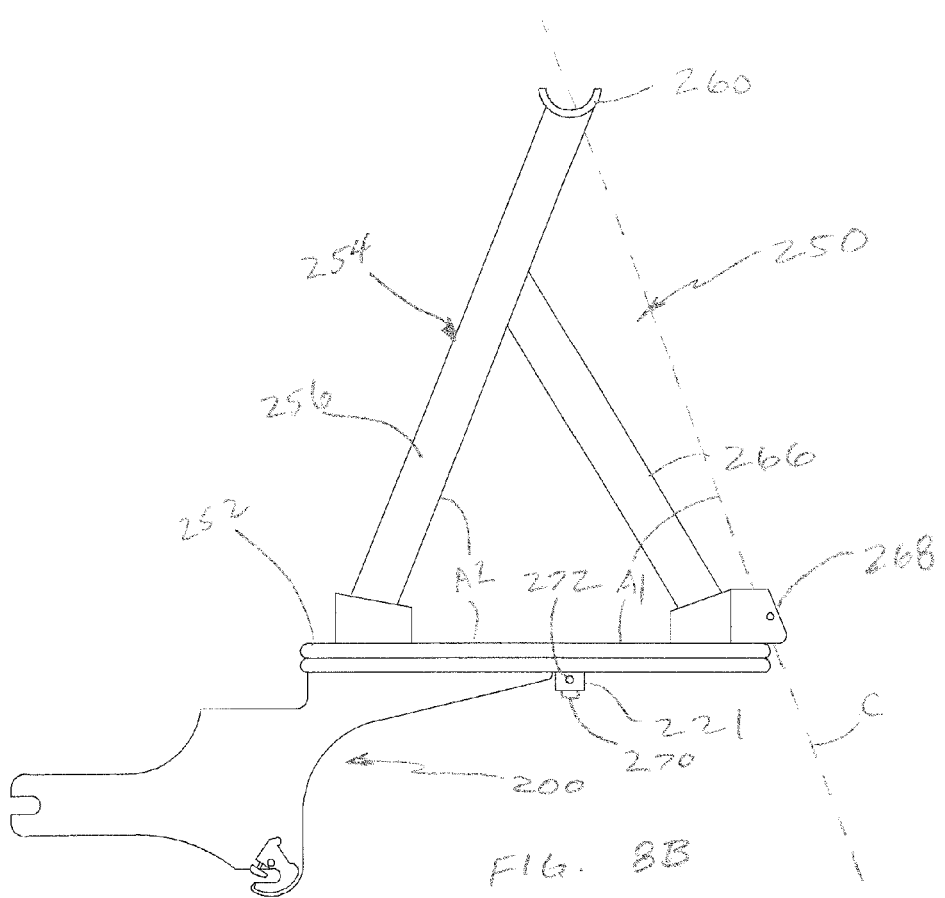

Referring now to FIGS. 8A and 8B, a second rack 250 is removeably attached to the first rack 200. The second rack 250 is comprised of a planar configured base member 252 to which an upwardly extending frame assembly 254 is attached. The frame assembly 254 is comprised of a pair of upwardly extending elongate members 256 and 258 fixedly attached to the base member 252 at a proximal end and having U-shaped receiving structures 260 and 262, respectively, attached to the distal end of each elongate member 256 and 258. A cross-member 264 is interposed and fixedly attached between the elongate members 256 and 258. A third upwardly extending member 266 is fixedly attached to the base member 252 at a proximal end and fixedly attached at a distal end proximate a center of the cross-member 264, effectively forming a modified A-frame configuration. A mounting bracket 268 is fixedly attached proximate the base of the third member 266. When cargo, represented by line C is attached to the second rack 250 by being held between the receiving structures 260 and 262 and bracket 268, the cargo C is held an angle A1 relative to the plane defined by the base member 252. As such, any portion of the cargo C that extends below the bracket 268 is angled away from the motorcycle to ensure that the cargo C is away from the rear fender and/or rear wheel of the motorcycle to provide adequate clearance between the cargo C and the motorcycle. Moreover, the height of the rack 250, and specifically, the height of the receiving structures 260 and 262 is such that cargo extending above the receiving structures 260 and 262 is positioned above the head of a passenger that may be using the rack 250 as a back rest as will be more fully described herein. To further move the rack 250 away from any such passenger, the upright member 256 of the rack 250 is angled away from the seat of the motorcycle at an angle A2 between the member 256 and the base member 252. The angles A1 and A2 may independently in the range of about 45 degrees to about 80 degrees with angles A1 and a2 in the configuration as illustrated being about 65 to 70 degrees.

The second rack is attached to the first rack 200 by securing the second rack to the docking member, such as docking member 221. Vertical pins 270 that are fixedly attached to the second rack 250 are positioned within a respective docking member 221 and held therein as with a locking pin 272.

Figure 9A:
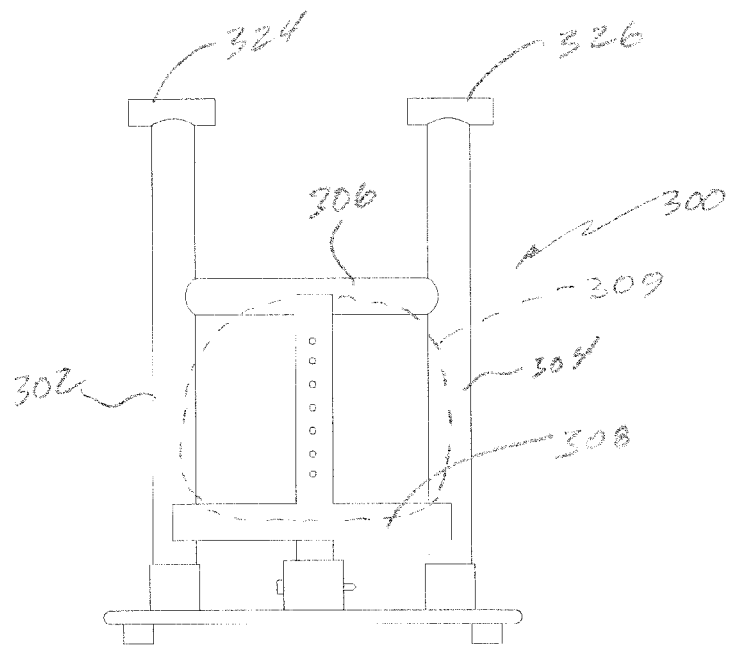
FIG. 9A is a front view of a second embodiment of a secondary motorcycle cargo rack forming an upright rack in accordance with the principles of the present invention.

FIG. 9A illustrates an embodiment of a second mounting rack 300 in accordance with the principles of the present invention similar in configuration to the rack 250 shown in FIGS. 8A and 8B. Attached to the front of the upright members 302 and 304 and the cross-member 306 is a back rest mounting structure 308 that may be welded to the front faces of the members 302, 304 and 206. The back rest mounting structure 308 has a T-shaped configuration with a vertical portion provided with a plurality of holes for attachment, as by bolting, of a back rest 309 at a desired height. The back rest 309 can be used for passengers on motorcycle riding behind the driver.

Figure 9B:
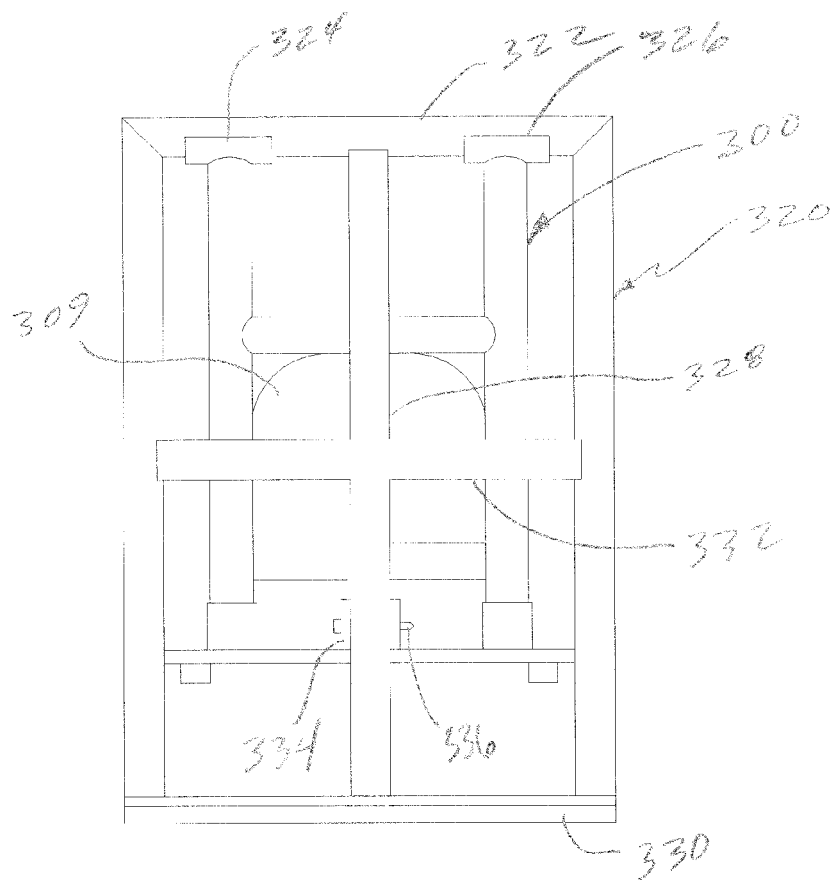
FIG. 9B is a rear view of a tertiary cargo rack attached to a secondary cargo rack in accordance with the principles of the present invention.

Various cargo can be mounted to the second mounting rack 300 in a substantially upright manner. As shown in FIG. 9B, a cargo rack 320 is releasably attached to the second mounting rack 300. The cargo rack 320 includes a horizontal member 322 configured to be received within and held by the receiving members 324 and 326. In this example, the receiving members 324 and 326 have a semi-circular cross-section for receiving therein a cylindrical horizontal member 322. Essentially, the cargo rack is hung from the receiving members 324 and 326. A vertically oriented center beam 328 is attached at one end to the member 322 and to a support platform 330 at the other end. A cross-beam 332 provides lateral support for the beam 328 and forms part of the cargo rack 320. The center beam 328 is captured and held within a bracket 334. The bracket 334 has a U-shaped configuration and is provided with a locking pin 336 that passes through the bracket 334 and the center beam 336 to hold the center beam 328 to the bracket 334. Because the bracket 334 prevents vertical movement of the cargo rack 320 when properly attached thereto, the top horizontal member 322 is firmly held within the receiving members 324 and 326. To release the cargo rack 320, the pin 336 is removed and the cargo rack can be lifted from the receiving members 324 and 326. Cargo can be attached to the cargo rack 320 with bungee cords, ties, wraps or the like with a substantial portion of the weight of the cargo being supported by the platform 330 that extends laterally from the bottom of the rack 320. Alternatively, the rack 320, or at least the top member 322 and vertical beam 328 incorporated into the cargo, such as a suitcase, duffle bag, backpack, etc. so that the particular cargo can attach directly to the rack 300. On the opposite side, a seat back rest 309 is attached to the mounting structure 308 to provide a back rest 309 for a rider of the motorcycle.

In another embodiment, a golf push cart, generally indicated at 400, is configured for mounting to the second rack according to the present invention, such as rack 300 of FIG. 9 or rack 250 of FIGS. 8A and 8B. The golf cart 400 is comprised of first and second frame members 402 and 404 that are pivotally coupled to each other at the pivot point P1 proximate the front wheel 406. An elongate brace member 408 is slideably and pivotally coupled relative to the first frame member 402 at one end and pivotally coupled to the second frame member 404 at the other end. A set of handlebars 410 are attached to the proximal end of the first frame member 402 for grasping by a user and for pushing the cart 400.

In order to allow the cart 400 to collapse and essentially fold flat, notches 412 and 414 are provided in the first and second frame members 402 and 404 respectively. This allows the first frame member 402, which has a U-shaped cross-section, to fit over the second frame member 404 and be substantially linearly aligned with the axle 416 fitting within the notch 412 and the brace attachment assembly 418 of the elongate brace member 408 to fit within the notch 414. The second frame member also has a U-shaped cross-section so that upon releasing the brace attachment assembly 418 from the first frame member 402, the brace attachment assembly 418 can slide within the channel 420 toward the front wheel 406 allowing the first frame member 402 to move toward the second frame member 404 and eventually fit over the second frame member 404 with the brace member 408 residing therein between. This configuration allows the first and second frame members 402 and 404 and the brace member 408 to be linearly aligned and centered from the center of the front wheel to the center of the axle 416. Once collapsed, the first and second frame members 402 and 404 can be locked together with a release pin 417 attached to the first frame member 402 that engages aperture 419 in the second frame member 404 or other fastening mechanisms known in the art.

The golf cart 400 is attached to the rack, such as rack 250 illustrated in FIG. 8B by hanging the axle 416 from the receiving structures 260 and 262. The bottom frame member 402 is then inserted into the bracket 268 and held with a pin that passes through the bracket 268 and through aperture 421 in the frame member.

The cart 400 is configured to be easily partially disassembled and/or adjusted as desired by the user. For example, the front wheel 406 is configured to be pinned to the second frame member 404 with releasable pin 422 that attaches the forks 424 to the frame member 404. The handle bars 410 are telescopically attached to the first frame member 402 with a selectively reliable compression collar 426 that allows a first shaft 428 of the handle bars 410 to slide relative to a second shaft 430 and then be firmly held relative thereto when the compression collar is reengaged.

Figure 10A:
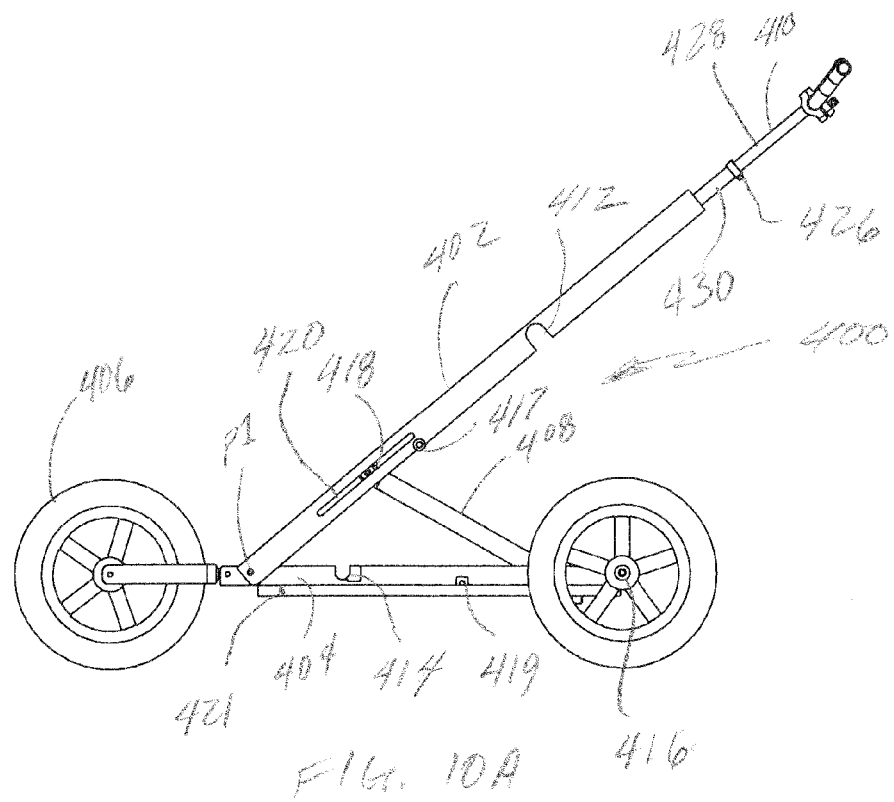
FIGS. 10A and 10B are side and bottom views of a third embodiment of a motorcycle cargo rack in the form of a golf push cart in accordance with the principles of the present invention.
Figure 10B:
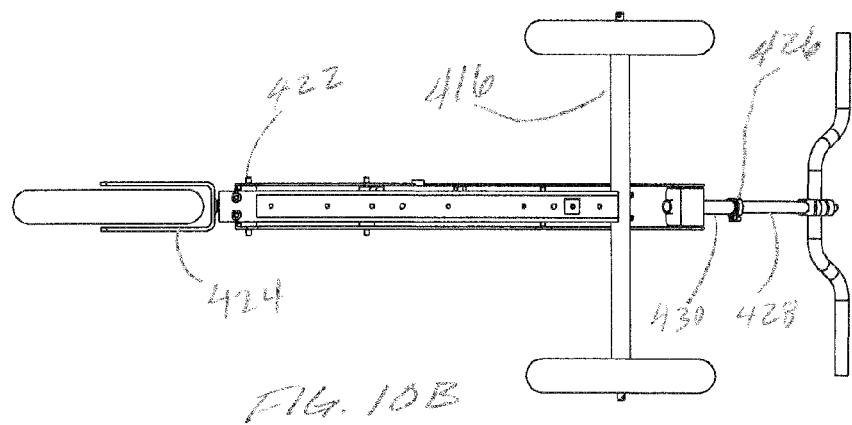

As illustrated in FIG. 11 illustrates a golf bag support assembly, generally indicated at 450, for attaching a golf bag to the rack according to the present invention, such as rack 250. The support assembly 450 is comprised of a T-shaped frame 452 having an elongate spine member 454 of rectangular cross-section and an elongate cylindrical top member 456 attached to a top end of the spine member 454 at a center portion thereof. The top member 456 is configured to hang on the receiving structures 260 and 262 of the frame 250 and the spine member 454 is configured to be received and pinned to the bracket 268 through aperture 458. Curved bag supports 460 and 462 are attached to the spine member 454, one proximate the top of the spine 454 and one positions proximate the bottom of the spine member 454. An L-shaped bottom support member or rest 464 is attached proximate the bottom end of the spine member 454 for supporting the bottom of the bag when attached to the bag support assembly 450. Straps (not shown) such as nylon webbing straps with VELCRO or mechanical fasteners can be attached to the supports 460 and 462 through slots 465, 466 and slots 467 and 468, respectively, for securing a golf bag thereto. The bag support assembly 450 can be attached to the frame 300 illustrated in FIG. 9B in a similar manner as the rack 320. It should be noted that while not specifically illustrated, the golf bag attachment structures 460, 462 and 464 are to be similarly attached to the front of the first frame member 402 of the golf cart 400 illustrated in FIG. 10A so as to be able to attach and secure a golf bag to the golf cart 400.

Figure 12:
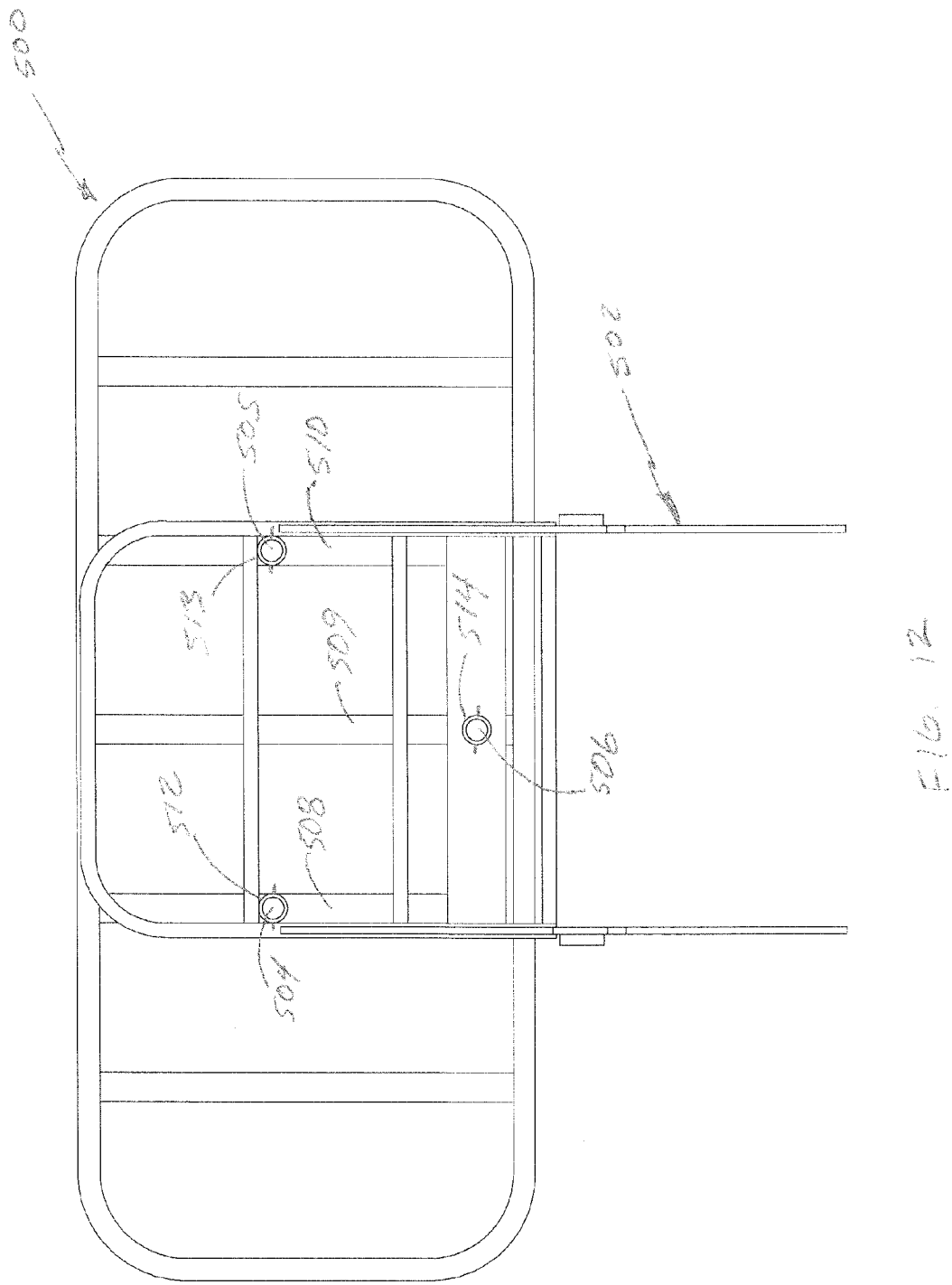
FIG. 12 is a bottom view of an alternative embodiment of a secondary cargo rack attached to a primary cargo rack in accordance with the principles of the present invention.

As illustrated in FIG. 12, other accessories having an arrangement of pins to mate with the primary rack may be directly mounted to the primary rack. In this example, a secondary rack 500 according to the present invention may be in the form of an elongated rack that is attached to a primary rack 502 so that the secondary rack 500 effectively widens the rack 502 to support cargo that may be larger than what could be effectively supported by the rack 502. For example, a set of golf clubs in a golf bag could be laid across the rack 500 and fastened thereto as with bungee cords or straps. As shown from the bottom of the rack 502, the secondary rack 500 sits on top of the primary rack 502 and is pinned thereto at three locations to ensure that the secondary rack 500 is securely fastened to the primary rack 502 and provide substantial structural linkage between the primary rack 502 and the secondary rack 500. The secondary rack 500 is provided with a plurality of downwardly extending pins 504, 505 and 506 that are fixedly coupled to the bottom of the cross-members 506, 509 and 510, respectively. The primary rack is provided with downwardly extending hollow cylinders 512, 513 and 514 that are fixedly attached to the primary or bottom rack 502 that is configured to be attached to a motorcycle. The pins 504, 505 and 506 mate with the cylinders 512, 513 and 514 and are pinned thereto to prevent the secondary rack 500 from unintended removal of the secondary rack 500 form the primary rack 502, as during driving situations.

Reference herein to specific details of the illustrated embodiments is by way of example and not by way of limitation. It will be appreciated by those of ordinary skill in the art that the embodiments described herein are not intended to limit the scope of the present invention. Various combinations and modifications of the embodiments described herein may be made without departing from the scope of the present invention and all modifications are meant to be included within the scope of the present invention. Thus, while certain exemplary embodiments and details have been described for purposes of describing the invention, it will be apparent to those of ordinary skill in the art that various changes in the invention described herein may be made without departing from the scope of the present invention, which is defined in the appended claims.

What is claimed is:

1. A cargo rack system for a motorcycle, comprising:
a first rack configured for mounting behind a seat of a motorcycle and extending at least partially over a rear wheel thereof, the first rack having at least one first attachment structure fixedly attached thereto;
a second rack comprising at least one second attachment structure fixedly attached to the first rack and configured for engaging with and being secured to the at least one first attachment structure, the second rack being positioned at least partially on top of the first rack when attached thereto, the second rack comprising a base, a pair of upwardly extending elongate members fixedly coupled to the base, the pair of upwardly extending elongate members extending from proximate one end of the base toward an opposite end of the base at an acute angel to the base with terminal ends of the pair of upwardly extending elongate members positioned over the base;
a pair of transversely extending U-shaped receiving members, a bottom central portion of each one of the pair of transversely extending U-shaped receiving members attached to a distal end of each respective one of the pair of upwardly extending elongate members;
a mounting bracket attached proximate the back end of the base; and
a cargo frame comprising at least one cross-member configured to be received within and supported by the pair of transversely extending U-shaped receiving members and at least one downwardly extending elongate member coupled to the at least one cross-member and configured for coupling to the mounting bracket to a form a multiple-point connection to the second rack, the cargo frame defining a first plane that is oriented at an acute angle relative to a second plane defined by the base member so that a top of the cargo frame is angled toward a front of the motorcycle and so that the second plane extends away from the rear wheel of the motorcycle and; at least one upwardly extending brace member coupled between the base member and the pair of upwardly extending elongate members for supporting the pair of upwardly extending elongate members, the at least one upwardly extending brace member upwardly angled toward a front of the motorcycle.

2. The cargo rack of claim 1, wherein the at least one upwardly extending brace member is coupled between a cross-member extending between the pair of upwardly extending elongate members and the mounting bracket, the mounting bracket being centrally located relative to the base.

3. The cargo rack of claim 1, wherein the pair of upwardly extending elongate members are angled at about between 45 and 80 degrees from the base.

4. The cargo rack of claim 1, further comprising a back rest mounting bracket attached to and between the pair of upwardly extending elongate members for attaching a back rest thereto.

5. The cargo rack of claim 1, further comprising a cross-member attached to and between the pair of upwardly extending elongate members and an upwardly extending brace member attached to and between the cross-member and the base proximate a rear side thereof.

6. The cargo rack of claim 1, wherein the acute angle is between about 45 and 80 degrees.

7. The cargo rack of claim 1, wherein the cargo frame comprises a T-shaped frame comprising one cross member and one downwardly extending elongate member attached proximate a center of the cross member, the one downwardly extending elongate member having an elongate member configured for attachment to the mounting bracket at one end and a cross-member attached proximate a second end, the cross-member configured for being retained within the U-shaped receiving members.

8. The cargo rack of claim 1, wherein the cargo frame further comprises a golf cart with the cross member configured for being retained within the transversely extending U-shaped receiving members and the at least one downwardly extending elongate member configured for being attached to the mounting bracket, the golf cart further comprising at least two bag supports coupled to the at least one downwardly extending elongate member for coupling a golf bag to the golf cart.

9. The cargo rack of claim 8, further comprising a second elongate member pivotally coupled to the at least one downwardly extending elongate member proximate a front wheel, a brace member pivotally coupled to the second elongate member proximate an end opposite the front wheel and selectively slidably coupled to the at least one downwardly extending elongate member, a handle configured for coupling to an end of the second longitudinally extending frame member opposite the front wheel and a pair of wheels, each attached to opposite ends of the cross member.

10. The cargo rack of claim 1, wherein the cross member comprises an axle of a golf cart.

11. A cargo rack system for a motorcycle, comprising:
a first rack configured for mounting to a motorcycle in a position in which the first rack extends from proximate a back of a seat of the motorcycle over a rear tire of the motorcycle, the first rack having at least one first attachment structure;
a second rack comprising:
a base, at least one second attachment structure attached to the base and configured for engaging with and being secured to the at least one first attachment structure, the second rack being positioned on top of the first rack when secured thereto;
a pair of upwardly extending elongate members coupled proximate a front side of the base and angled toward a rear of the motorcycle at an acute angle relative to the base with terminal ends of the pair of upwardly extending elongate members positioned over the base;
a U-shaped receptacle attached at a central bottom portion to each of the terminal ends of the pair of upwardly extending elongate members;
an elongate cross-member attached to and extending between the pair of upwardly extending elongate members;
a centrally located mounting bracket attached proximate a rearward side of the base; and
a cargo frame comprised of at least one top member being horizontally oriented and configured to be received in and supported by the U-shaped receptacles and at least one downwardly extending member attached to the at least one top member at an upper end and coupled to the mounting bracket proximate a lower end forming a multi-point attachment between the cargo frame and the second rack, the cargo frame resting at an acute angle to the base
and; at least one upwardly extending brace member coupled between the base member and the pair of upwardly extending elongate members for supporting the pair of upwardly extending elongate members, the at least one upwardly extending brace member upwardly angled toward a front of the motorcycle.

12. The cargo rack of claim 11, wherein the pair of upwardly extending elongate members are angled at about between 45 and 80 degrees from the base toward the rear of the motorcycle.

13. The cargo rack of claim 11, further comprising a back rest mounting bracket attached to and between the pair of upwardly extending elongate members for attaching a back rest thereto.

14. The cargo rack of claim 11, wherein the acute angle between the cargo frame and the base is between about 45 and 80 degrees.

15. The cargo rack of claim 14, wherein the acute angle between the pair of upwardly extending members and the base and the acute angle between the cargo frame and the base are between about 65 and 70 degrees.

16. The cargo rack of claim 11, wherein further comprising a T-shaped frame having an elongate member configured for attachment to the mounting bracket at one end and a cross-member attached proximate a second end, the cross-member configured for being retained within the U-shaped receptacles.

17. The cargo rack of claim 11, wherein the cargo frame further comprises a golf cart with the at least one top member configured for being retained within the U-shaped receptacles and the at least one downwardly extending elongate member configured for being attached to the mounting bracket, the golf cart further comprising at least two bag supports coupled to the at least one downwardly extending elongate member for coupling a golf bag to the golf cart.

18. The cargo rack of claim 17, further comprising a second elongate member pivotally coupled to the at least one downwardly extending elongate member proximate a front wheel, a brace member pivotally coupled to the second elongate member proximate an end opposite the front wheel and selectively slidably coupled to the at least one downwardly extending elongate member, a handle configured for coupling to an end of the second longitudinally extending frame member opposite the front wheel and a pair of wheels, each attached to opposite ends of the at least one top member.

19. The cargo rack of claim 11, wherein the cross member comprises an axle of a golf cart.

* * * * *